(12) United States Patent
Hirose

(10) Patent No.: US 6,515,803 B2
(45) Date of Patent: Feb. 4, 2003

(54) ZOOM LENS SYSTEM

(75) Inventor: Masatoshi Hirose, Sakurai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/858,441

(22) Filed: May 16, 2001

(65) Prior Publication Data
US 2002/0015235 A1 Feb. 7, 2002

(30) Foreign Application Priority Data
May 17, 2000 (JP) ........................................ 2000-145033

(51) Int. Cl.⁷ ................................................ G02B 15/14
(52) U.S. Cl. ...................... 359/682; 359/680; 359/684; 359/685; 359/686; 359/714; 359/737; 359/649; 359/770; 359/753; 359/754
(58) Field of Search ................................ 359/680–682, 359/683–686, 714, 737, 649–651, 770, 753, 754, 761

(56) References Cited

U.S. PATENT DOCUMENTS

| | | | | |
|---|---|---|---|---|
| 5,900,987 A | * | 5/1999 | Kreitzer | 359/649 |
| 5,905,596 A | * | 5/1999 | Watanabe | 359/649 |
| 5,966,250 A | * | 10/1999 | Shimizu | 356/649 |
| 6,008,952 A | * | 12/1999 | Yamamoto | 359/683 |
| 6,137,638 A | * | 10/2000 | Yamagishi et al. | 359/649 |

FOREIGN PATENT DOCUMENTS

| | | |
|---|---|---|
| JP | 08-251520 | 9/1996 |
| JP | 10-268193 | 10/1998 |
| WO | WO 96/36184 A1 | 11/1996 |

* cited by examiner

*Primary Examiner*—Evelyn A. Lester
(74) *Attorney, Agent, or Firm*—Sidley Austin Brown & Wood LLP

(57) ABSTRACT

A zoom lens system having multiple lens units including, sequentially in a direction from an enlargement side thereof toward a reduction side thereof, a first lens unit having a negative optical power, a second lens unit having a positive optical power, a third lens unit having a positive optical power, a fourth lens unit having a negative optical power, and a fifth lens unit having positive optical power. Additionally, during a zoom operation from a longest focal length condition to a shortest focal length condition, the zoom lens system can function such that the first lens unit and the fifth lens unit can remain stationary, while the second, third and fourth lens units are able to move.

28 Claims, 3 Drawing Sheets

FNO=1.63
(T)
— d
—··— g
—·— c
——— SC
−0.2  0.2
SPHERICAL ABERRATION
SINE CONDITION

Y'=12.8
——— DM
——— DS
−0.2  0.2
ASTIGMATISM

Y'=12.8
−2.0  2.0
DISTORTION %

FNO=1.50
(W)
— d
—··— g
—·— c
——— SC
−0.2  0.2
SPHERICAL ABERRATION
SINE CONDITION

Y'=12.8
——— DM
——— DS
−0.2  0.2
ASTIGMATISM

Y'=12.8
−2.0  2.0
DISTORTION %

FNO=1.78
(T)
— d
—··— g
—·— c
——— SC
−0.2  0.2
SPHERICAL ABERRATION
SINE CONDITION

Y'=12.8
——— DM
——— DS
−0.2  0.2
ASTIGMATISM

Y'=12.8
−2.0  2.0
DISTORTION %

ZOOM LENS SYSTEM

RELATED APPLICATION

This application is based on Patent Application No. 2000-145033 filed in Japan, the content of which is hereby incorporated by reference.

FIELD OF THE INVENTION

The present invention relates to a zoom lens, for example, a zoom lens suitable as a projection optical system used in a projection device (liquid crystal projector for projecting an image on a screen such as a liquid crystal panel and the like).

DESCRIPTION OF THE RELATED ART

Liquid crystal projectors provided with a liquid crystal panel having a micro lens array to brighten the projection image have recently become very popular. Conventional zoom lenses often used in liquid crystal projectors have an F-number of approximately F2.5, but when a liquid crystal panel having a micro lens array is used, a brighter (small F-number) zoom lens is required.

It is difficult to reduce the F-number while satisfying optical performance requirements in a projection zoom lens. For example, Japanese Laid-Open Publication No. 10-268193 discloses a zoom lens of the negative-positive-positive-negative-positive type, wherein aberration correction is difficult when the zoom lens is brighter at the wide angle end with an F-number of approximately 1.5.

SUMMARY OF THE INVENTION

An object of the present invention is to provide an improved zoom lens.

Another object of the present invention is to provide a zoom lens, which is bright and provides high performance, for use in a projector.

These objects are attained by a zoom lens system comprising, sequentially from the enlargement side thereof: a first lens unit having negative optical power, a second lens unit having positive optical power, a third lens unit having positive optical power, a fourth lens unit having negative optical power, and a fifth lens unit having positive optical power, wherein the first and fifth lens units are stationary units, and during zooming from a longest focal length condition to a shortest focal length position, the second lens unit and the third lens unit move in the direction from the enlargement side toward the reduction side and the fourth lens unit moves in the direction from the reduction side toward the enlargement side, and the following conditions (1)~(4) are satisfied.

$$-2.0 < f1/fW < -1.1 \tag{1}$$

$$1.3 < f2/fW < 2.7 \tag{2}$$

$$3.5 < f3/fW < 20 \tag{3}$$

$$0.6 < f5/fW < 1.2 \tag{4}$$

Where fW represents the focal length of the total system at the shortest focal length position, f1 represents the focal length of the first lens unit, f2 represents the focal length of the second lens unit, f3 represents the focal length of the third lens unit, and f5 represents the focal length of the fifth lens unit.

In another aspect of the invention, a projection system comprises a light source, at least one liquid crystal panel, an optical integrating system for focusing a light from the light source on to the liquid crystal panel, and a projection optical system. The projection optical system comprises, sequentially from an enlargement side thereof to a reduction side thereof, a first lens unit having negative optical power, a second lens unit having positive optical power, a third lens unit having positive optical power, a fourth lens unit having negative optical power, and a fifth lens unit having positive optical power, wherein the first and fifth lens units are stationary units, and during zooming from a longest focal length condition to a shortest focal length condition, the second lens unit and the third lens unit move in the direction from the enlargement side to the reduction side and the fourth lens unit moves in the direction from the reduction side to the enlargement side, and at least one of the following conditions (1)~(4) are satisfied.

$$-2.0 < f1/fW < -1.1 \tag{1}$$

$$1.3 < f2/fW < 2.7 \tag{2}$$

$$3.5 < f3/fW < 20 \tag{3}$$

$$0.6 < f5/fW < 1.2 \tag{4}$$

Where fW represents the focal length of the total system at the shortest focal length position, f1 represents the focal length of the first lens unit, f2 represents the focal length of the second lens unit, f3 represents the focal length of the third lens unit, and f5 represents the focal length of the fifth lens unit.

BRIEF DESCRIPTION OF THE DRAWINGS

These and other objects and features of this invention will become clear from the following description taken in conjunction with the preferred embodiments with reference to the accompanying drawings, in which.

DESCRIPTION OF THE PREFERRED EMBODIMENTS

The zoom lens of the present invention is described hereinafter with reference to the accompanying drawings. The embodiments described below are zoom lenses suitable for use as the projection optical system for a projector device (liquid crystal projector), but needless to say, are suitable for use as an image sensing optical system for a solid state image sensing device (e.g., video camera and digital camera).

Figure 1:
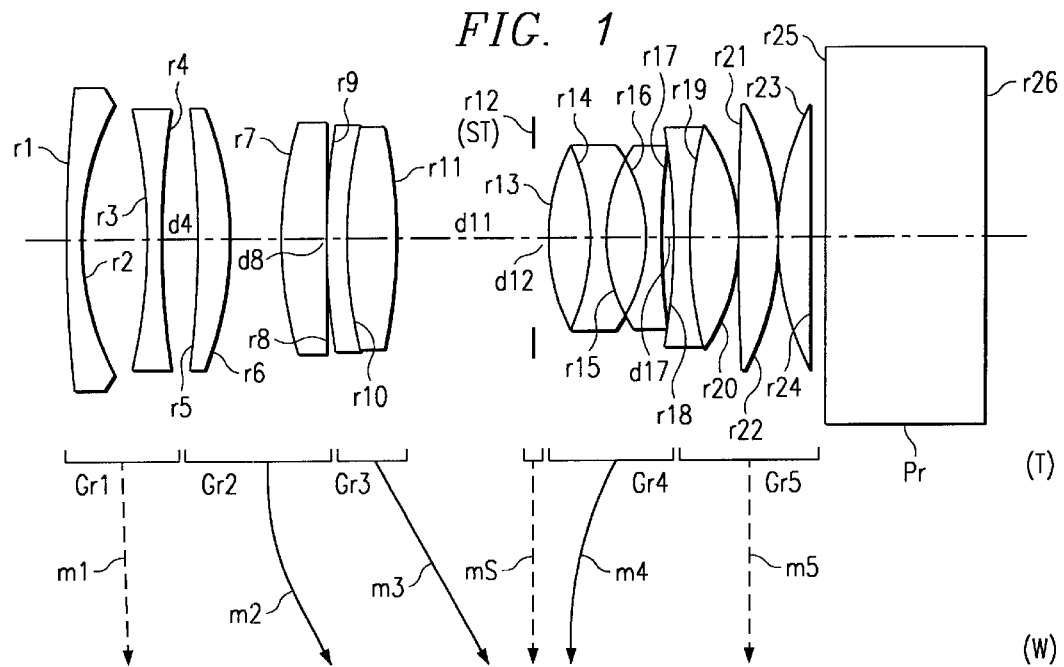
FIG. 1 is a lens structural diagram of a first embodiment (example 1)
Figure 2:
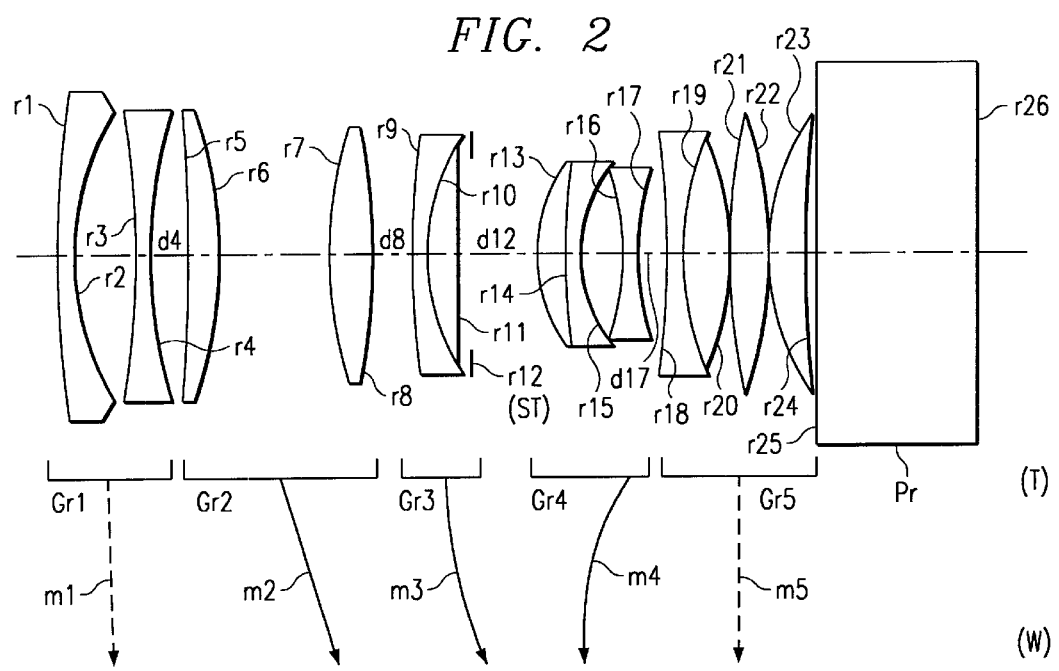
FIG. 2 is a lens structural diagram of a second embodiment (example 2)
Figure 3A:
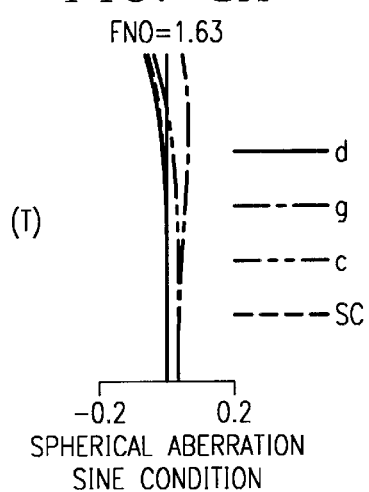
FIG. 3 is an aberration diagram of example 1.
Figure 3B:
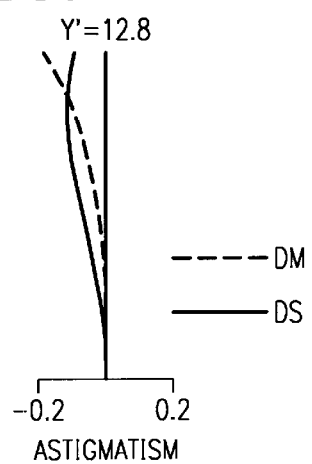
Figure 3C:
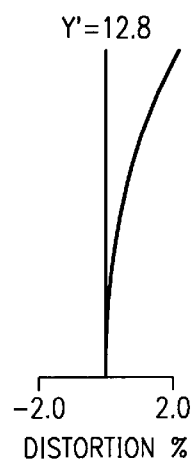
Figure 3D:
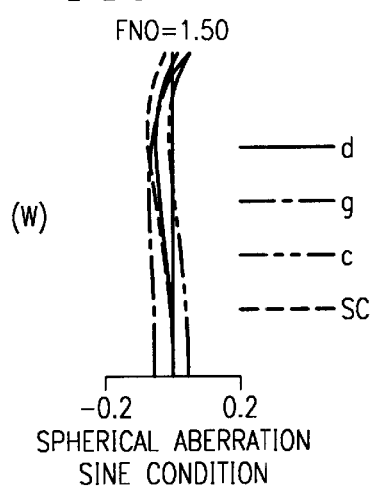
Figure 3E:
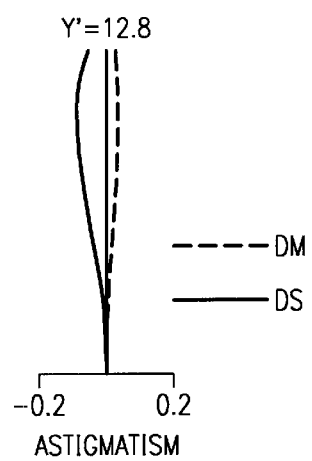
Figure 3F:
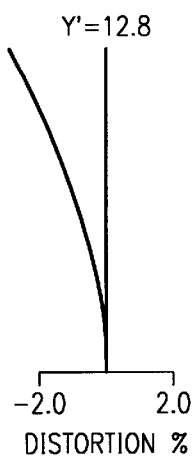
Figure 4A:
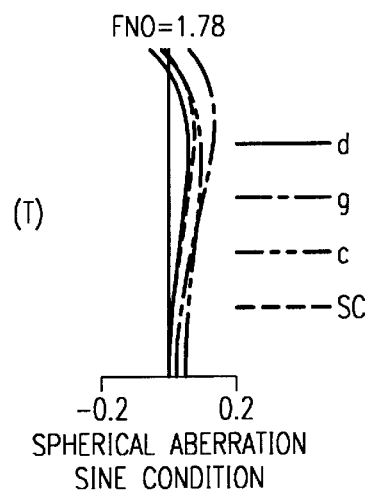
FIG. 4 is an aberration diagram of example 2.
Figure 4B:
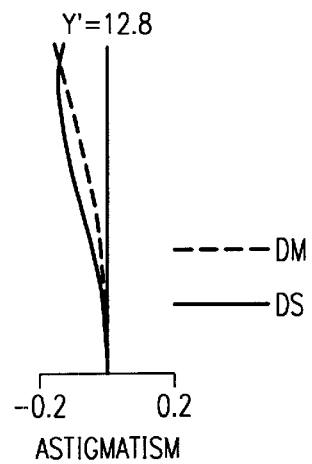
Figure 4C:
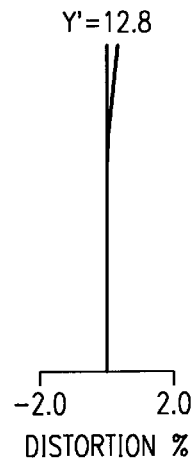
Figure 4D:
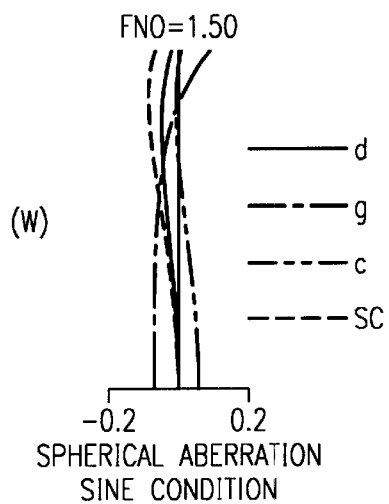
Figure 4E:
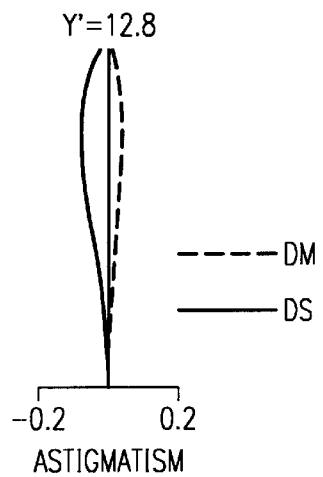
Figure 4F:
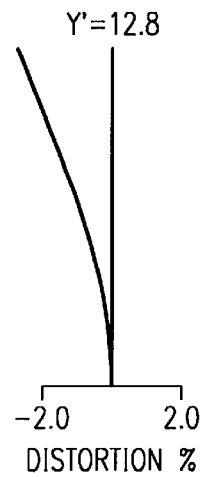

FIGS. 1 and 2 are lens structural diagrams corresponding to the zoom lenses of the first and second embodiments, respectively, and show the lens arrangement at the telephoto end (T). In each lens structural diagram, the arrows mj (j=1, 2, 3, 4, 5) and the arrow mS schematically represent the movement of the No. j unit (Grj) and the aperture stop (ST), respectively, in zooming from the telephoto end (longest focal length end, T) to the wide angle end (shortest focal length end W), and the dashed arrows (m1, m5, mS) represent the fixed positions during zooming. Also, in the lens structural diagrams, a surface with an appended symbol ri (i=1, 2, 3, ...) represents the No. i surface counting from the enlargement side (i.e., projection side), and an axial distance with the appended symbol di represents the variable spacing which changes during zooming among the axial spacing di (i=1, 2, 3, ...) of the No. i surface counting from the enlargement side.

The first and second embodiments are 5-element zoom lenses comprising, sequentially from the enlargement side: a first lens unit (Gr1) having negative optical power, a second lens unit (Gr2) having positive optical power, a third lens unit (Gr3) having positive optical power, a fourth lens unit (Gr4) having negative optical power, and a fifth lens unit (Gr5) having positive optical power, and dichroic prism (Pr) which remains stationary during zooming is disposed on the reduction side of the fifth lens unit (Gr5). The zoom elements comprise the stationary elements of the first lens unit (Gr1) and the fifth lens unit (Gr5), and the moving elements of the second lens unit (Gr2), third lens unit (Gr3), and the fourth lens unit (Gr4).

In these embodiments, during zooming from the telephoto end (T) to the wide angle end (W), the second lens unit (Gr2) and the third lens unit (Gr3) move from the enlargement side to the reduction side (m2, m3), and the fourth lens unit (Gr4) moves from the reduction side to the enlargement side. During zooming, the spacing of the first lens unit (Gr1) and the second lens unit (Gr2) and the spacing of the fourth lens unit (Gr4) and the fifth lens unit (Gr5) increase monotonically and the spacing of the second lens unit (Gr2) and the third lens unit (Gr3) increases monotonically in the first embodiment (FIG. 1), but this monotonicity is reduced in the second embodiment (FIG. 2). Furthermore, although the aperture stop (ST) arranged between the third lens unit (Gr3) and the fourth lens unit (Gr4) is at a fixed, stationary position during a zooming operation, as described in the first embodiment (FIG. 1), the aperture stop (ST) can move during a zooming operation as part of the third lens unit (Gr3) in the second embodiment (FIG. 2). Focusing is accomplished, for example, by moving the focus of the first lens unit (Gr1).

In the first embodiment (FIG. 1), each lens unit is constructed as described below sequentially from the enlargement side. The first lens unit (Gr1) comprises a negative meniscus lens having a concave surface on the reduction side, and a biconcave negative lens. The second lens unit (Gr2) comprises a positive meniscus lens having a convex surface on the reduction side, and a positive meniscus lens having a convex surface on the enlargement side. The third lens unit (Gr3) is a cemented lens comprising a negative meniscus lens having a concave surface on the reduction side, and a biconvex positive lens. The fourth lens unit (Gr4) has a cemented lens including a biconvex positive lens and a biconcave negative lens, and includes a biconcave negative lens. The fifth lens unit (Gr5) has a cemented lens comprising a biconcave negative lens and a biconvex positive lens, and includes two biconvex positive lenses.

In the second embodiment (FIG. 2), each lens unit is constructed as described below sequentially from the enlargement side. The first lens unit (Gr1) comprises a negative meniscus lens having a concave surface on the reduction side, and a biconcave negative lens. The second lens unit (Gr2) comprises a positive meniscus lens having a convex surface on the reduction side, and a biconvex positive lens. The third lens unit (Gr3) has a cemented lens including a negative meniscus lens having a concave surface on the reduction side and a positive meniscus lens having a convex surface on the enlargement side, and an aperture stop (ST). The fourth lens unit (Gr4) has a cemented lens including a positive meniscus lens having a convex surface on the enlargement side and a negative meniscus lens having a concave surface on the reduction side, and a biconcave negative lens. The fifth lens unit (Gr5) has a cemented lens including a biconcave negative lens and a biconvex positive lens, a biconvex positive lens, and a positive meniscus lens having a convex surface on the enlargement side.

In these embodiments, a stationary element having negative optical power is disposed on the outermost position on the enlargement side. The diameter of the lens of the first lens unit (Gr1) can be reduced by having the first lens unit (Gr1), which has a negative optical power, remain stationary during zooming. Even when the first lens unit (Gr1) is extended for focusing, the mechanical structure of the first lens unit (Gr1) can be simple and compact in the diameter direction. Accordingly, the zoom lens is compact in the diameter direction.

In a 5-piece zoom lens of the negative-positive-positive-negative-positive type wherein the first lens unit (Gr1) and the fifth lens unit (Gr5) are stationary elements and the second lens unit (Gr2) and the third lens unit (Gr3) move from the enlargement side to the reduction side and the fourth lens unit (Gr4) moves from the reduction side to the enlargement side during zooming from the telephoto end (T) to the wide angle end (W), it is desirable that the at least one condition among the conditions (1)–(4) below is satisfied, and is even more desirable that all conditions (1)–(4) are satisfied. A bright (small F-number) high-performance zoom lens can be realized which is suitable for a liquid crystal projector having a liquid crystal panel provided with a micro lens array.

$$-2.0 < f1/fW < -1.1 \tag{1}$$

$$1.3 < f2/fW < 2.7 \tag{2}$$

$$3.5 < f3/fW < 20 \tag{3}$$

$$0.6 < f5/fW < 1.2 \tag{4}$$

Where fW represents the focal length of the total system at the wide angle end, f1 represents the focal length of the first lens unit, f2 represents the focal length of the second lens unit, f3 represents the focal length of the third lens unit, f5 represents the focal length of the fifth lens unit.

Condition (1) stipulates the optical power of the first lens unit (Gr1). When the lower limit of condition (1) is exceeded, the optical power of the first lens unit (Gr1) is too weak, and the first lens unit (Gr1) requires excessive movement when the unit (Gr1) is extended for focusing. For this reason, there is large aberration fluctuation from an infinity focus position to a near field focus position, and it becomes difficult to balance performance at the infinity focus positions and near field focus positions. Conversely, when the upper limit of condition (1) is exceeded, the optical power of the first lens unit (Gr1) becomes excessive, and distortion cannot be controlled.

Conditions (2) and (3) stipulate the optical power of the second lens unit (Gr2) and the third lens unit (Gr3), respectively. When the lower limit of condition (2) or condition (3) is exceeded, the optical power of the second lens unit (Gr2) or the third lens unit (Gr3) becomes excessively strong, and it becomes difficult to control aberration. Conversely, when the upper limit of condition (2) or condition (3) is exceeded, the optical power of the second lens unit (Gr2) or the third lens unit (Gr3) becomes weak and the amount of movement required for zooming increases. As a result, the total length is increased, and the size of the first lens unit (Gr1) becomes large due to the aperture stop (ST) position.

Condition (4) stipulates the optical power of the fifth lens unit (Gr5). When the lower limit of condition (4) is exceeded, the optical power of the fifth lens unit (Gr5) becomes excessively strong, and the required back focus for the arrangement of the dichroic prism (Pr) cannot be ensured. Conversely, when the upper limit of condition (4) is exceeded, the optical power of the fifth lens unit (Gr5) becomes weak, the back focus becomes excessively long so as to enlarge the projection system.

It is desirable that condition (5) below, which stipulates the optical power balance of the second lens unit (Gr2) and the third lens unit (Gr3), is satisfied in order to balance the size and optical performance of the zoom lens. The compactness and high optical performance of the zoom lens can be effectively maintained while providing a bright zoom lens by satisfying condition (5). When the lower limit of condition (5) is exceeded, the total length of the zoom lens is increased, and conversely, when the upper limit of condition (5) is exceeded, it becomes difficult to control various types of aberration.

$$0.6 < (fW/f2) + (fW/f3) < 0.75 \quad (5)$$

Although the various lens elements comprising the previously described embodiments are only refractive type lenses which deflect incident light by refraction (i.e., lenses of a type which accomplish deflection by the interface of similar media having different refractive indices), the present invention is not limited to this arrangement. For example, the lens elements may be constructed of lenses of the diffractive type which deflect incident rays by diffraction, lenses of the refraction-diffraction hybrid type which deflect incident rays using a combination of diffractive action and refractive action, lenses of the refractive distribution type which deflect incident rays by the refractive distribution within the medium and the like. Furthermore, at least one lens surface may be an aspherical surface to obtain effective aberration correction.

Figure 5:
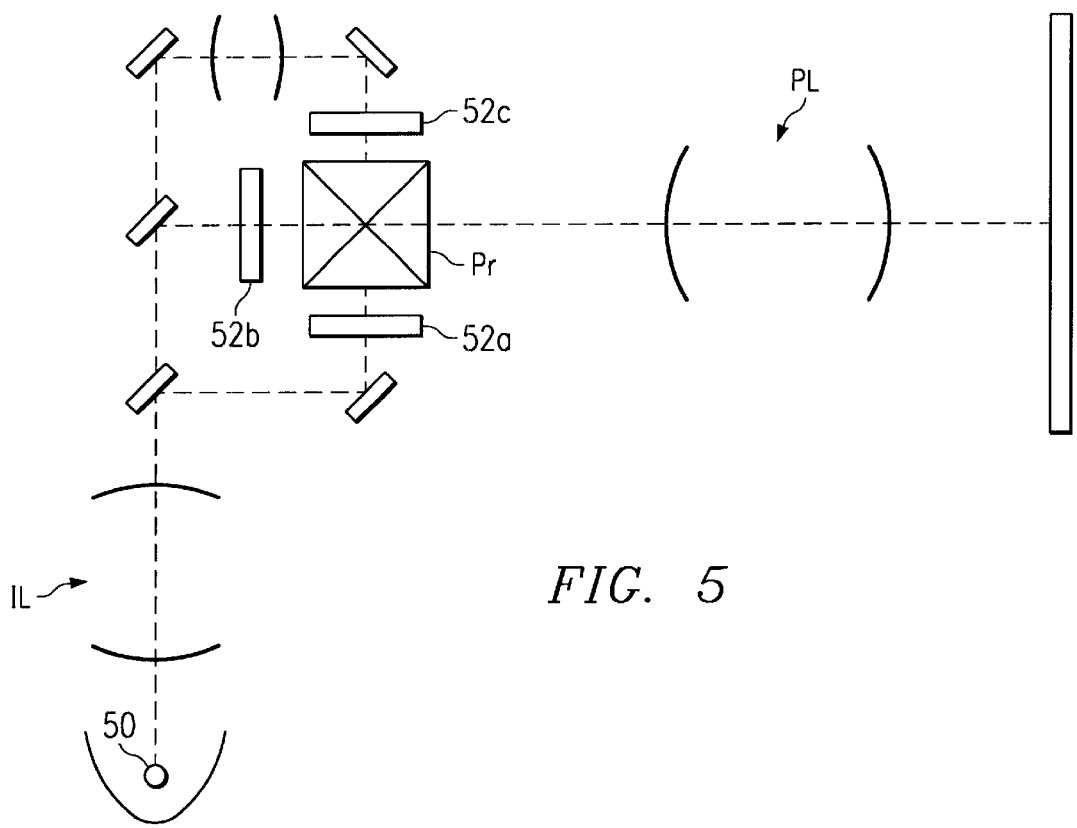
FIG. 5 is a projection device including a projection optical system of the present invention.

The zoom lens systems of the first and second embodiments, described above, are suitable for use as a projection optical system P1 for a projection device, illustrated in FIG. 5. In a preferred embodiment, the projection device is provided with a light source 50, an optical integrating system I1, three liquid crystal panels 52a, 52b, and 52c, and a projection optical system P1, as described in the first and second embodiments.

The optical integrating system I1, of the projection system, focuses a light emitted from the light source onto the three liquid crystal panels 52a, 52b, and 52c. At an intermediate position, after the light leaves the optical integrator system I1 and before the light impinges the liquid crystal panels 52a, 52b, and 52c, the light in the optical integrator system I1 is separated into R, G, B color data. The three liquid panels 52a, 52b, and 52c are then used to selectively transmit the R, G, B color data, respectively, to the projection optical system P1, which projects an image onto a projection surface. The projection optical system P1 is preferably the zoom lens system as described in the first and second embodiments, and satisfies the requirements set forth in conditions (1)–(5), as previously described.

Further, In the projection system, the prism Pr disposed on the reduction side of the fifth lens element Gr5 can be used to combine the color data received from each liquid crystal panels 52a, 52b, and 52c, and to transmit the combined color data to the projection optical system P1. Additionally, relay lens configurations can be used in the projection system as needed.

The structure of the zoom lens of the present invention is described below by way of examples using construction data. Examples 1 and 2 respectively correspond to the first and second embodiments, and the lens structural diagrams (FIGS. 1 and 2) of the first and second embodiments represent the lens structures of the corresponding examples 1 and 2.

In the construction data of the examples, ri (i=1, 2, 3, ...) represents the number i surface and its radius of curvature (mm) counting from the enlargement side, di (i=1, 2, 3, ...) represents the axial spacing (mm) of the number i surface counting from the enlargement side, Ni (i=1, 2, 3, ...) and vi (i=1, 2, 3, ...) respectively represent the d-line refractive index (Nd) and Abbe number (vd) of the number i lens counting from the enlargement side. In the construction data, the axial spacing which changes during zooming is the variable air gap at the telephoto end (long focal length state, T) to the middle (intermediate focal length state, M), and wide angle end (short focal length, W). The total system focal length (f, mm), F-number (FNO), and corresponding value of each condition are described at each focal length state (T), (M), (W).

FIGS. 3 and 4 are aberration diagrams corresponding to examples 1 and 2, and show various types of aberration (sequentially from the left: spherical aberration, astigmatism, distortion; where Y' is the maximum image height) relative to an object at infinity on the reduction side at the telephoto end (T) and wide angle end (W). In the spherical aberration diagrams, the solid line represents the d-line spherical aberration, the single-dash line (g) represents the g-line spherical aberration, the double-dash line (c) represents c-line spherical aberration, and the broken line (SC) represents the sine condition. In the astigmatism diagrams, the broken line (DM) represents d-line astigmatism on the meridional plane, and the solid line (DS) represents the d-line astigmatism on the sagittal plane. In the distortion diagrams, the solid line represents the percentage distortion on the d-line. Although the screen surface (projection surface) is primarily the image surface and the display element surface (e.g., liquid crystal surface) is the object surface, when each example was used as a projection zoom lens in a projection device (e.g., liquid crystal projector), the optical performance was evaluated using the each example as a reduction system (e.g., an image sensing optical system) wherein the screen surface is the object surface and optical performance was evaluated at the display element surface.

First Embodiment f = 40.0(T)~35.0(M)~29.0(W)
FNO = 1.63(T)~1.50(W)
Condition (1): f1/fW = −1.65       Condition (2): f2/fW = 1.98
Condition (3): f3/fW = 5.36        Condition (4): f5/fW = 0.81
Condition (5): (fW/f2) + (fW/f3) = 0.69

| [Radius of Curvature] | [Refractive Index] | [Abbe Number] |
|---|---|---|
| [Axial Distance] | | |
| r1 = 153.003 | | |
| d1 = 2.500 | N1 = 1.61800 | v1 = 63.39 |
| r2 = 42.883 | | |
| d2 = 11.333 | | |
| r3 = −96.953 | | |
| d3 = 2.500 | N2 = 1.51680 | v2 = 64.20 |
| r4 = 125.189 | | |
| d4 = 5.829~9.910~17.311 | | |
| r5 = −247.485 | | |
| d5 = 4.879 | N3 = 1.74400 | v3 = 44.93 |
| r6 = −70.699 | | |
| d6 = 9.207 | | |
| r7 = 59.320 | | |
| d7 = 8.000 | N4 = 1.62041 | v4 = 60.29 |

-continued

```
r8 = 27240.533
        d8 = 0.300~6.226~11.994
r9 = 170.088
        d9 = 2.500      N5 = 1.75520    v5 = 27.51
r10 = 58.331
        d10 = 8.000     N6 = 1.62041    v6 = 60.29
r11 = −142.242
        d11 = 23.958~13.951~0.782
r12 = ∞(ST)
        d12 = 1.236~0.853~0.818
r13 = 27.381
        d13 = 6.979     N7 = 1.75520    v7 = 27.51
r14 = −37.647
        d14 = 2.500     N8 = 1.71736    v8 = 29.42
r15 = 22.052
        d15 = 7.283
r16 = −26.094
        d16 = 2.500     N9 = 1.75520    v9 = 27.51
r17 = 103.577
        d17 = 2.602~2.984~3.019
r18 = −152.780
        d18 = 2.500     N10 = 1.75520   v10 = 27.51
r19 = 60.448
        d19 = 8.000     N11 = 1.62041   v11 = 60.29
r20 = −34.999
        d20 = 0.300
r21 = 194.513
        d21 = 6.253     N12 = 1.69350   v12 = 50.29
r22 = −51.377
        d22 = 0.300
r23 = 42.530
        d23 = 6.541     N13 = 1.61800   v13 = 63.39
r24 = ∞
        d24 = 2.000
r25 = ∞
        d25 = 27.000    N14 = 1.51680   v14 = 64.20
r26 = ∞
```

Second Embodiment

```
f = 40.0(T)~35.0(M)~29.0(W)
FNO = 1.78(T)~1.50(W)
Condition (1): f1/fW = −1.52    Condition (2): f2/fW = 1.62
Condition (3): f3/fW = 16.40    Condition (4): f5/fW = 1.01
Condition (5): (fW/f2) + (fW/f3) = 0.68
[Radius of Curvature]   [Refractive Index]
        [Axial Distance]                [Abbe Number]
r1 = 158.364
        d1 = 2.500      N1 = 1.62041    v1 = 60.29
r2 = 41.832
        d2 = 10.607
r3 = −148.587
        d3 = 2.500      N2 = 1.51680    v2 = 64.20
r4 = 73.506
        d4 = 6.021~9.871~16.591
r5 = −698.134
        d5 = 5.245      N3 = 1.74400    v3 = 44.93
r6 = −78.884
        d6 = 18.529
r7 = 59.455
        d7 = 7.165      N4 = 1.62041    v4 = 60.29
r8 = −118.368
        d8 = 6.814~3.023~0.300
r9 = 112.292
        d9 = 2.500      N5 = 1.75520    v5 = 27.51
r10 = 33.992
        d10 = 5.220     N6 = 1.62041    v6 = 60.29
r11 = 875.457
        d11 = 2.153
r12 = ∞(ST)
        d12 = 11.633~7.259~0.300
r13 = 25.380
        d13 = 4.561     N7 = 1.75520    v7 = 27.51
r14 = 101.238
        d14 = 2.500     N8 = 1.61720    v8 = 54.00
```

-continued

```
r15 = 21.661
        d15 = 7.303
r16 = −53.191
        d16 = 2.500     N9 = 1.75520    v9 = 27.51
r17 = 45.406
        d17 = 4.783~9.098~12.060
r18 = −165.703
        d18 = 2.500     N10 = 1.75520   v10 = 27.51
r19 = 46.375
        d19 = 8.000     N11 = 1.62041   v11 = 60.29
r20 = −48.735
        d20 = 0.300
r21 = 106.483
        d21 = 6.188     N12 = 1.62041   v12 = 60.29
r22 = −70.311
        d22 = 0.300
r23 = 39.003
        d23 = 6.177     N13 = 1.62041   v13 = 60.29
r24 = 235.777
        d24 = 2.000
r25 = ∞
        d25 = 27.000    N14 = 1.51680   v14 = 64.20
r26 = ∞
```

The present invention realizes a bright (small F-number) m high-performance zoom lens. For example, if the zoom lens of the present invention is used in a liquid crystal projector provided with a liquid crystal panel having a micro lens array, a brighter projection image can be obtained than by a conventional zoom lens.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A zoom lens system, comprising, sequentially from an enlargement side thereof to a reduction side thereof:

a first lens unit having a negative optical power;

a second lens unit having a positive optical power;

a third lens unit having a positive optical power;

a fourth lens unit having a negative optical power; and a fifth lens unit having a positive optical power, wherein, during a zoom operation from a longest focal length condition to a shortest focal length condition the following conditions are satisfied:

$$-2.0 < f1/fW < -1.1 \quad (1)$$

$$1.5 < f2/fW < 2.7 \quad (2)$$

$$3.5 < f3/fW < 20 \quad (3)$$

$$0.6 < f5/fW < 1.2 \quad (4)$$

where, fW represents a focal length of the zoom lens system at the shortest focal length condition;

f1 represents a focal length of said first lens unit;

f2 represents a focal length of said second lens unit;

f3 represents a focal length of said third lens unit; and f5 represents a focal length of said fifth lens unit.

2. A zoom lens system according to claim 1, wherein, in a direction from the enlargement side thereof to the reduction side thereof, said first lens unit comprises a negative meniscus lens having a concave surface on the reduction side, and a biconcave negative lens, said second lens unit comprises a positive meniscus lens having a convex surface on the reduction side, and a positive meniscus lens having a convex surface on the enlargement side, said third lens unit comprises a negative meniscus lens having a concave surface on the reduction side, and a biconvex positive lens, said fourth lens unit comprises a biconvex positive lens, a biconcave negative lens, and a biconcave negative lens, and said fifth lens unit comprises a biconcave negative lens, a biconvex positive lens, and two biconvex positive lenses.

3. A zoom lens system according to claim 1, wherein, in a direction from the enlargement side thereof to the reduction side thereof, said first lens unit comprises a negative meniscus lens having a concave surface on the reduction side, and a biconcave negative lens, said second lens unit comprises a positive meniscus lens having a convex surface on the reduction side, and a biconvex positive lens, said third lens unit comprises a negative meniscus lens having a concave surface on the reduction side, a positive meniscus lens having a convex surface on the enlargement side, and an aperture stop, said fourth lens unit comprises a positive meniscus lens having a convex surface on the enlargement side, a negative meniscus lens having a concave surface on the reduction side, and a biconcave negative lens, and said fifth lens unit comprises a biconcave negative lens, a biconvex positive lens, a biconvex positive lens, and a positive meniscus lens having a convex surface on the enlargement side.

4. A zoom lens system according to claim 1, wherein the following condition is satisfied:

$$0.6 < (fW/f2) + (fW/f3) < 0.75$$

where, fW represents the focal length of the zoom lens system at the shortest focal length condition;

f2 represents the focal length of said second lens unit; and f3 represents the focal length of said third lens unit.

5. A zoom lens system according to claim 1, wherein, during a zoom operation from the longest focal length condition to the shortest focal length condition, said first lens unit and said fifth lens unit remain stationary, said second lens unit and said third lens unit move in a direction from an enlargement side toward a reduction side of the zoom lens system, and said fourth lens unit moves in a direction from a reduction side toward an enlargement side of the zoom lens system.

6. A zoom lens system according to claim 5, wherein, during a zoom operation from the longest focal length condition to the shortest focal length condition, a distance between said first lens unit and said second lens unit monotonically increases, a distance between said fourth lens unit and said fifth lens unit monotonically increases, and a distance between said first lens unit and said third lens unit monotonically increases.

7. A zoom lens system according to claim 5, further comprising:

an aperture stop positioned between said third lens unit and said fourth lens unit; and a prism positioned on the reduction side of said fifth lens unit.

8. A zoom lens system according to claim 7, wherein during a zoom operation from the longest focal length condition to the shortest focal length condition, said aperture stop and said prism remain stationary.

9. A zoom lens system according to claim 7, wherein during a zoom operation from the longest focal length condition to the shortest focal length condition said prism remains stationary and said aperture stop is capable of moving with said third lens unit.

10. A projection optical system, comprising, sequentially from an enlargement side thereof to a reduction side thereof:

a first lens unit having a negative optical power, said first lens unit being a stationary unit during a zoom operation;

a second lens unit capable of movement during a zoom operation, said second lens unit having a positive optical power;

a third lens unit capable of movement during a zoom operation, said third lens unit having a positive optical power;

a fourth lens unit capable of movement during a zoom operation, said fourth lens unit having a negative optical power; and a fifth lens unit having a positive optical power, said fifth lens unit being a stationary unit during a zoom operation;

wherein, during a zoom operation from a longest focal length condition to a shortest focal length condition the following conditions are satisfied:

$$-2.0 < f1/fW < -1.1 \quad (1)$$

$$1.5 < f2/fW < 2.7 \quad (2)$$

$$3.5 < f3/fW < 20 \quad (3)$$

$$0.6 < f5/fW < 1.2 \quad (4)$$

where, fW represents a focal length of the projection optical system at the shortest focal length condition;

f1 represents a focal length of said first lens unit;

f2 represents a focal length of said second lens unit;

f3 represents a focal length of said third lens unit; and f5 represents a focal length of said fifth lens unit.

11. A projection optical system according to claim 10, wherein, in a direction from the enlargement side thereof to the reduction side thereof, said first lens unit comprises a negative meniscus lens having a concave surface on the reduction side, and a biconcave negative lens, said second lens unit comprises a positive meniscus lens having a convex surface on the reduction side, and a positive meniscus lens having a convex surface on the enlargement side, said third lens unit comprises a negative meniscus lens having a concave surface on the reduction side, and a biconvex positive lens, said fourth lens unit comprises a biconvex positive lens, a biconcave negative lens, and a biconcave negative lens, and said fifth lens unit comprises a biconcave negative lens, a biconvex positive lens, and two biconvex positive lenses.

12. A projection optical system according to claim 10, wherein, in a direction from the enlargement side thereof to the reduction side thereof, said first lens unit comprises a negative meniscus lens having a concave surface on the reduction side, and a biconcave negative lens, said second lens unit comprises a positive meniscus lens having a convex surface on the reduction side, and a biconvex positive lens, said third lens unit comprises a negative meniscus lens having a concave surface on the reduction side, a positive meniscus lens having a convex surface on the enlargement side, and an aperture stop, said fourth lens unit comprises a positive meniscus lens having a convex surface on the enlargement side, a negative meniscus lens having a concave surface on the reduction side, and a biconcave negative lens, and said fifth lens unit comprises a biconcave negative lens, a biconvex positive lens, a biconvex positive lens, and a positive meniscus lens having a convex surface on the enlargement side.

13. A projection optical system according to claim 10, further comprising:
   a prism positioned on the reduction side of said fifth lens unit; and
   an aperture stop positioned between said third lens unit and said fourth lens unit, said aperture stop being fixed during a zoom operation.

14. A projection optical system according to claim 10, further comprising:
   a prism positioned on the reduction side of said fifth lens unit; and
   an aperture stop positioned between said third lens unit and said fourth lens unit, wherein said aperture stop is capable of moving with said third lens unit during a zoom operation.

15. A projection optical system according to claim 10, wherein the following condition is satisfied:

$$0.6<(fW/f2)+(fW/f3)<0.75$$

where,
fW represents the focal length of the projection optical system at the shortest focal length condition;
f2 represents the focal length of the second lens unit; and
f3 represents the focal length of the third lens unit.

16. A projection optical system according to claim 10, wherein, during a zoom operation from the longest focal length condition to the shortest focal length condition, said second lens unit and said third lens unit move in a direction from an enlargement side toward a reduction side, and said fourth lens unit moves in a direction from a reduction side toward an enlargement side.

17. A projection optical system according to claim 16, wherein, during a zoom operation from the longest focal length condition to the shortest focal length condition, a distance between said first lens unit and said second lens unit monotonically increases, a distance between said fourth lens unit and said fifth lens unit monotonically increases, and a distance between said first lens unit and said third lens unit monotonically increases.

18. A projection device, comprising:
   a light source;
   at least one liquid crystal panel;
   an optical integrating system for focusing a light from said light source to said at least one liquid crystal panel; and
   a projection optical system for projecting a light from said liquid crystal panel to a projection surface, said projection optical system comprising, sequentially from an enlargement side thereof to a reduction side thereof:
   a first lens unit having a negative optical power, said first lens unit being a stationary unit during a zoom operation;
   a second lens unit capable of movement during a zoom operation, said second lens unit having a positive optical power;
   a third lens unit capable of movement during a zoom operation, said third lens unit having a positive optical power;
   a fourth lens unit capable of movement during a zoom operation, said fourth lens unit having a negative optical power; and
   a fifth lens unit having a positive optical power, said fifth lens unit being a stationary unit during a zoom operation;
   wherein, during a zoom operation from a longest focal length condition to a shortest focal length condition the following conditions are satisfied:

$$-2.0<f1/fW<-1.1 \tag{1}$$

$$1.5<f2/fW<2.7 \tag{2}$$

$$3.5<f3/fW<20 \tag{3}$$

$$0.6<f5/fW<1.2 \tag{4}$$

where,
fW represents a focal length of the projection optical system at the shortest focal length condition;
f1 represents a focal length of said first lens unit;
f2 represents a focal length of said second lens unit;
f3 represents a focal length of said third lens unit; and
f5 represents a focal length of said fifth lens unit.

19. A projection device according to claim 18, wherein, in a direction from the enlargement side thereof to the reduction side thereof, said first lens unit comprises a negative meniscus lens having a concave surface on the reduction side, and a biconcave negative lens, said second lens unit comprises a positive meniscus lens having a convex surface on the reduction side, and a positive meniscus lens having a convex surface on the enlargement side, said third lens unit comprises a negative meniscus lens having a concave surface on the reduction side, and a biconvex positive lens, said fourth lens unit comprises a biconvex positive lens, a biconcave negative lens, and a biconcave negative lens, and said fifth lens unit comprises a biconcave negative lens, a biconvex positive lens, and two biconvex positive lenses.

20. A projection device according to claim 18, wherein, in a direction from the enlargement side thereof to the reduction side thereof, said first lens unit comprises a negative meniscus lens having a concave surface on the reduction side, and a biconcave negative lens, said second lens unit comprises a positive meniscus lens having a convex surface on the reduction side, and a biconvex positive lens, said third lens unit comprises a negative meniscus lens having a concave surface on the reduction side, a positive meniscus lens having a convex surface on the enlargement side, and an aperture stop, said fourth lens unit comprises a positive meniscus lens having a convex surface on the enlargement side, a negative meniscus lens having a concave surface on the reduction side, and a biconcave negative lens, and said fifth lens unit comprises a biconcave negative lens, a biconvex positive lens, a biconvex positive lens, and a positive meniscus lens having a convex surface on the enlargement side.

21. A projection device according to claim 18, wherein the following condition is satisfied:

$$0.6<(fW/f2)+(fW/f3)<0.75$$

where,
fW represents the focal length of the projection optical system at the shortest focal length condition;

f2 represents the focal length of said second lens unit; and f3 represents the focal length of said third lens unit.

22. A projection device according to claim 18, wherein, during a zoom operation from the longest focal length condition to the shortest focal length condition, said first lens unit and said fifth lens unit remain stationary, said second lens unit and said third lens unit move in a direction from an enlargement side toward a reduction side of the zoom lens system, and said fourth lens unit moves in a direction from a reduction side toward an enlargement side of the zoom lens system.

23. A projection device according to claim 22, wherein, during a zoom operation from the longest focal length condition to the shortest focal length condition, a distance between said first lens unit and said second lens unit monotonically increases, a distance between said fourth lens unit and said fifth lens unit monotonically increases, and a distance between said first lens unit and said third lens unit monotonically increases.

24. A projection device according to claim 18, further comprising a prism positioned on the reduction side of said fifth lens unit, said prism for transmitting light from said at least one liquid crystal panel to said projection optical system.

25. A projection device according to claim 24, wherein said at least one liquid crystal panel comprises three liquid crystal panels.

26. A projection device according to claim 24, further comprising an aperture stop positioned between said third lens unit and said fourth lens unit.

27. A projection device according to claim 26, wherein during a zoom operation from the longest focal length condition to the shortest focal length condition, said aperture stop remains stationary.

28. A projection device according to claim 26, wherein said aperture stop is a member of said third lens unit, and during a zoom operation from the longest focal length condition to the shortest focal length condition said aperture stop moves with said third lens unit.

* * * * *